US012786758B2

(12) United States Patent
Cyril et al.

(10) Patent No.: US 12,786,758 B2
(45) Date of Patent: Nov. 3, 2026

(54) PROVIDING UNINTERRUPTED SERVICE IN A COMMUNICATIONS NETWORK BY IDENTIFYING A CRITICAL DISCREPANCY BETWEEN ONTOLOGICAL KNOWLEDGE GRAPHS OF NETWORK PROVISIONING CATALOG VERSIONS

(71) Applicant: T-MOBILE INNOVATIONS LLC, Overland Park, KS (US)

(72) Inventors: Henry Pradeep Kumar Cyril, Bothell, WA (US); Shrustishree Sumanth, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 211 days.

(21) Appl. No.: 18/830,944

(22) Filed: Sep. 11, 2024

(65) Prior Publication Data

US 2026/0075444 A1 Mar. 12, 2026

(51) Int. Cl.

| | |
|---|---|
| ***H04W 24/04*** | (2009.01) |
| ***G06N 5/02*** | (2023.01) |
| ***H04W 4/50*** | (2018.01) |
| ***H04W 8/30*** | (2009.01) |

(52) U.S. Cl.

CPC .............. *H04W 24/04* (2013.01); *G06N 5/02* (2013.01); *H04W 4/50* (2018.02); *H04W 8/30* (2013.01)

(58) Field of Classification Search

None

See application file for complete search history.

(56) References Cited

U.S. PATENT DOCUMENTS

| | | | | |
|---|---|---|---|---|
| 12,132,620 | B2 * | 10/2024 | Taware | G06F 16/285 |
| 12,591,471 | B2 * | 3/2026 | Portisch | G06F 9/542 |
| 2020/0183754 | A1 * | 6/2020 | Hashimoto | G06F 8/71 |
| 2020/0366580 | A1 * | 11/2020 | Sinha | H04L 41/082 |
| 2022/0295351 | A1 * | 9/2022 | Cyril | H04W 4/24 |
| 2023/0300033 | A1 * | 9/2023 | Taware | H04L 67/51 709/220 |
| 2024/0296079 | A1 * | 9/2024 | Portisch | G06N 5/022 |
| 2024/0296080 | A1 * | 9/2024 | Portisch | G06F 9/542 |
| 2026/0005934 | A1 * | 1/2026 | Cyril | H04L 41/5009 |

* cited by examiner

*Primary Examiner* — Rafael Pérez-Gutiérrez

(74) *Attorney, Agent, or Firm* — Shook, Hardy & Bacon L.L.P.

(57) ABSTRACT

A Network Provisioning Engine (NPE) is responsible for provisioning services to a user equipment (UE) being serviced by a communications network. When a network provisioning catalog utilized by the NPE is misconfigured, the UE may experience an interruption in service. In order to provide uninterrupted service, ontology may be used to generate knowledge graphs that represent relationships and attributes within different versions of the network provisioning catalog where each Customer Facing Service (CFS) may be modeled to capture the network configurations and dependencies. These models may be transformed into ontological knowledge graphs for each catalog version where they may compared in order to identify critical discrepancies and a catalog version that won't result in interrupted service can be selected to provision the CFS to the UE.

19 Claims, 6 Drawing Sheets

PROVIDING UNINTERRUPTED SERVICE IN A COMMUNICATIONS NETWORK BY IDENTIFYING A CRITICAL DISCREPANCY BETWEEN ONTOLOGICAL KNOWLEDGE GRAPHS OF NETWORK PROVISIONING CATALOG VERSIONS

SUMMARY

The present disclosure is directed, in part, to providing uninterrupted service in a communications network, substantially as shown and/or described in connection with at least one of the figures, and as set forth more completely in the claims.

According to various aspects of the technology, communication networks typically use network provisioning to configure and deploy network resources and services to enable connectivity and functionality to end customers. This process is typically managed through systems such as a Network Provisioning Engine (NPE), which interfaces with a network provisioning catalog that maps Customer Facing Service (CFS) requests to the corresponding network configurations (e.g., Network Facing Services (NFSs)). When managing the network provisioning process, a comparison of different versions of a network provisioning catalog can only be done with the current production version and the developmental version being created or modified by network engineers. When the development version of the network provisioning catalog is eventually deployed, issues may arise because there is no convenient way to compare the new version with the old version. Such a lack of post-implementation comparison can lead to undetected discrepancies that may cause service disruptions. To address these issues, an approach may be implemented where different versions of the network provisioning catalog are parsed and transformed into ontological knowledge graphs, which may provide a structured and detailed representation of the entities, relationships, and attributes within each catalog version. By comparing the ontological knowledge graphs of the old and new catalog versions, any critical discrepancies that may have been introduced during the update can be identified and fixed. Accordingly, aspects described herein are directed to systems and methods for generating ontological knowledge graphs to compare different network provisioning catalogs and identify critical discrepancies, enhancing the user experience by providing uninterrupted service in the communications network.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

DETAILED DESCRIPTION

Figure 1:
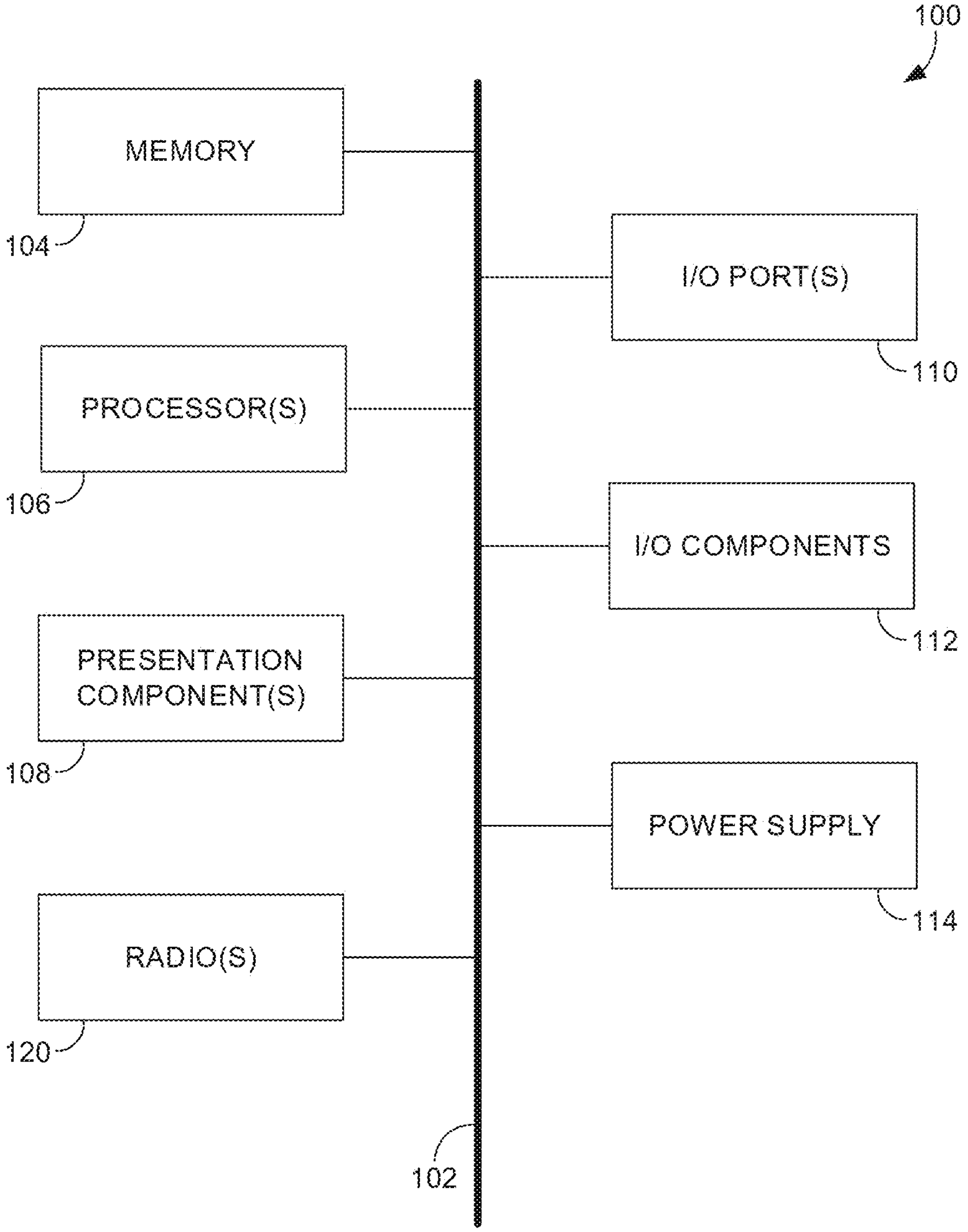
FIG. 1 illustrates an exemplary computing device for use with the present disclosure.

By way of background, operators in communications networks typically use an application (e.g., a Catalog Management System (CMS)) for the continuous integration and deployment (CI/CD) of network provisioning catalogs. This application may manage the process of updating ad and maintaining the catalog, which contains the essential mappings and configurations required to deliver CFSs through NFSs and Network Elements (NEs). Within this workflow, operators may make changes to the catalog in a developmental environment, where they test and validate modifications before integrating them into the production version of the catalog. In doing so, operators may utilize Technical Steering Committee (TSC) summaries to provide comparisons between the catalog version currently being developed and the production version of the catalog currently being deployed. TSC summaries, however, are limited in that they only compare the current developmental catalog with the current production catalog without offering insights into how the current production catalog differs from a previous (or any version other than the current development catalog) catalog version. Since the TSC summaries do not include comparisons between the current production catalog and previous production catalogs, operators may struggle to identify and track discrepancies, which may have evolved across multiple versions. This issue is compounded when multiple engineers are making updates in a CI/CD system. Without the ability to compare different production versions, critical discrepancies, such as unintended changes in service configurations or network attributes, might remain hidden, potentially causing service disruptions or degradation over time. Furthermore, manually tracking and comparing different production catalog versions is time-consuming and prone to errors, making it difficult to maintain consistency and accuracy in network provisioning so that uninterrupted service can be provided in the communications network.

To address these issues, the present disclosure is directed to systems and methods for providing uninterrupted service to a UE in a communications network by provisioning services to the UE using an appropriate version of a network provisioning catalog. For example, these issues may be addressed with ontological knowledge graphs by leveraging the structured relationships and attributed defined within the JavaScript Object Notation (JSON) schemas of each CFS in the network provisioning catalog. Each CFS may be represented as a JSON file that follows a specific schema, encapsulating the relationships among different network attributes for service provisioning. Using ontology, these relationships may be replicated and structured within a knowledge graph, which may be generated and manipulated using tools (e.g., an OWLReady2 Python library). After parsing different versions of the network provisioning catalog (e.g., a first version and a second version), ontological knowledge graphs can be generated for each version, capturing intricate relationships and dependencies specified in the JSON schemas. By comparing these ontological graphs across different catalog versions, operators may identify any critical discrepancies that may have been introduced in newer versions. For example, if a comparison reveals that a key attribute or relationship essential for provisioning a CFS has been altered or misconfigured in the latest catalog version, this could potentially lead to service degradation or failure when a UE requests that service. Upon identifying such a critical discrepancy, the provisioning system can automatically revert to, or select, the previous catalog version to provision the CFS to the UE. By using ontological knowledge graphs to compare the relationships defined in the CFSs, operators can maintain the integrity of the network provisioning catalog and help ensure consistent, uninterrupted service to end customers, even as the catalog evolves over time. The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., **32*d*** Edition, 2022).

The example aspects and embodiments described in the present disclosure are provided within the context of a wireless telecommunication network for illustrative purposes. However, it should be understood that the principles and techniques discussed herein are not limited to wireless networks alone. The concepts and methodologies can be equally applied to other types of communication networks, including but not limited to wired, satellite, and optical networks. These alternative networks are capable of supporting the functionalities and applications described, and their use falls within the scope of the present disclosure.

As used herein, the term "radio access network (RAN)" node may refer to a centralized component or system of components that is configured to wirelessly communicate (receive and/or transmit signals) with a plurality of stations (i.e., wireless communication devices, also referred to herein as user equipment (UE(s)) in a particular geographic area. As used herein, the term "network access technology (NAT)" is synonymous with wireless communication protocol and is an umbrella term used to refer to the particular technological standard/protocol that governs the communication between a UE and a RAN; examples of network access technologies include 3G, 4G, 5G, 6G, 802.11x, and the like.

As used herein, the term "Network Provisioning Engine (NPE)" may refer to a system within a communications network that automates the process of translating CFS requests into NFSs. For example, an NPE may receive provisioning transactions from systems like billing or customer management, identify the relevant CFS, and use a catalog to map the relevant CFS to the corresponding NFSs. An NPE may help ensure that the appropriate NEs (e.g., HLR/HSS, Charging Systems, Policy Enforcement Servers, etc.) are configured to enable and manage the requested services in order to provide uninterrupted service. For example, an NPE may access brand-specific catalogs to provision services across various network components. To provide seamless and/or uninterrupted service to a UE, it may be important that an NPE provisions a CFS to the UE based on an appropriate version of a network provisioning catalog.

As used herein, the term "network provisioning catalog" may refer to a structured repository within a communications network that maintains mappings and relationships between CFSs and NFSs. For example, a network provisioning catalog may help define how customer requests (e.g., service activations or modifications) translate into network configurations and resource allocations across various NEs. A network provisioning catalog may include detailed mappings of service specifications, network attributes, and configuration parameters for different brands and sub-brands. A network provisioning catalog may be used by an NPE to accurately provision services and help ensure that the NEs are configured correctly to support the requested services, thereby helping enable consistent and reliable service delivery without interruption.

As used herein, the term "Customer Facing Service (CFS)" may refer to a service provided by a communications network that is directly used and/or interacted with by end customers (e.g., at a UE). By way on non-limiting examples, such service may include one or more of voice calls, text messaging, internet access, and data plans. Delivery of a CFS to end customers may depend on the proper configurations of underlying network resources. For example, while a CFS is a visible aspect of what the network provides to end customers, its implementation and management may be supported by corresponding NFSs and NEs.

As used herein, the term "Network Facing Service (NFS)" may refer to a service within a communications network that supports the operation and delivery of a CFS by managing the underlying network infrastructure and resources. For example, a NFS may encompass various technical functions such as routing, bandwidth management, security, and QoS enforcement, which may be helpful in maintaining the network's performance and reliability. A "Network Element (NE)" may refer to a hardware or software component within the network that performs specific functions for the operation of a NFS. For example, an NE may include routers, switches, Home Location Registers (HLR), Policy Enforcement Servers (NAP), and Charging Systems (CS). NEs may work together under the control of NFSs to enable and deliver the CFS to end customers.

As used herein, the term "catalog application" may refer to an application (e.g., Catalog Management System (CMS)) designed to handle the creation, maintenance, and deployment of network provisioning catalogs that contain details mappings between CFSs, NFSs, and NEs. The catalog application may manage the continuous integration and continuous deployment of changes to a network provisioning catalog such as adding new services, modifying existing service configurations, and/or updating network attributes. The catalog application may help ensure that an NPE has access to the most current and/or properly configured version of a network provisioning catalog to help provide efficient and reliable service delivery in a communications network.

As used herein, the term "ontological knowledge graph" of a network provisioning catalog (e.g., a first catalog version) may refer to a structured representation that models the entities, relationships, and attributes involved in the network provisioning process within a communications network. The graph uses ontology to define the various classes (e.g., CFSs, NFSs, and NEs), their relationships (e.g., how services are mapped to network resources), and specific attributes (e.g., configuration parameters, service types, and network attributes) that are used when provisioning services. As will be discussed further with respect to the figures, by providing a CMS with the ability to organize these elements into an ontological knowledge graph, the ontology may provide a comprehensive and interconnected view of how services are provisioned, managed, and delivered across the network.

As used herein, the term "critical discrepancy" may refer to a mismatch or error in the mapping, configuration, or deployment of network resources that directly impacts the availability, functionality, and/or performance of CFSs. For example, when comparing two different versions of a network provisioning catalog, a critical discrepancy may be identified in one of the versions if the HLR or HSS is misconfigured during the provisioning process, leading to incorrect subscribers authentication parameters, which may prevent end customers from accessing network services. The term "non-critical discrepancy" may refer to an inconsistency or variation between two different versions of a network provisioning catalog that does not result in interrupted service provided to end customers. For example, a non-critical discrepancy may be identified when a new feature, such as enhanced voicemail options, is added in the latest version of the network provisioning catalog but has not yet been fully integrated or synchronized across all relevant systems. As a result, this feature may not appear in customer interfaces or provisioning processes for certain sub-brands; however, this does not interrupt any existing services, so it would be considered a non-critical discrepancy.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

A first aspect of the present disclosure is directed to a system for providing uninterrupted wireless communication service to a user equipment (UE) in a wireless communications network. The system includes a radio access network node, a network storage device of the wireless communications network, and a network device comprising one or more processors. The system further includes a non-transitory computer-readable media configured to generate an ontological knowledge graph for a first catalog version of a network provisioning catalog. The computer-readable media is further configured to receive a request from the UE for a Customer Facing Service (CFS) to be provisioned by the wireless communication network. The computer-readable media is further configured to generate an ontological knowledge graph for a second catalog version, wherein the first catalog version and the second catalog version comprise two different representations of a same segment associated with the CFS. The computer-readable media is further configured to, based on a comparison of the knowledge graph of the first catalog version with the knowledge graph of the second catalog version, identify a critical discrepancy in the second catalog version. The computer-readable media is further configured to, based on identifying the critical discrepancy in the second catalog version, provision the CFS to the UE using the first catalog version.

A second aspect of the present disclosure is directed to a non-transitory computer-readable media that, when executed, cause a user equipment comprising one or more processors to perform operations for providing uninterrupted wireless communication service to a user equipment (UE) in a wireless communication network. For example, the computer-readable media is configured to generate an ontological knowledge graph for a first catalog version of a network provisioning catalog and to generate an ontological knowledge graph for a second catalog version, the second catalog version comprising a different representation of a same Customer Facing Service (CFS) as the first catalog version. The computer-readable media is further configured to generate a discrepancy report based on a comparison of the ontological knowledge graph of the first catalog version and the ontological knowledge graph of the second catalog version, the discrepancy report comprising one or more identified discrepancies between the first catalog version and the second catalog version. The computer-readable media is further configured to determine that the one or more identified discrepancies comprise only non-critical discrepancies and, based on the determination, instruct a network provisioning engine to provision the CFS to the UE using the second catalog version.

A third aspect of the present disclosure is directed to a method for service provisioning discrepancy analysis in a communications network. The method includes generating an ontological knowledge graph for a first catalog version of a network provisioning catalog. The method further includes generating an ontological knowledge graph for a second catalog version of the network provisioning catalog. The method further includes identifying a critical discrepancy between the first catalog version and the second catalog version based on a comparison of the knowledge graph of the first catalog version with the knowledge graph of the second catalog version.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment (UE), wireless communication device, or user device, The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 may be in the form of a dedicated solid state memory or flash memory, such as a subscriber information module (SIM). Computer storage media does not comprise a propagated data signal.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

The radio 120 represents one or more radios that facilitate communication with one or more wireless networks using one or more wireless links. While a single radio 120 is shown in FIG. 1, it is expressly contemplated that there may be more than one radio 120 coupled to the bus 102. In aspects, the radio 120 utilizes a transmitted to communicate with a wireless telecommunications network. It is expressly contemplated that a computing device 100 with more than one radio 120 could facilitate communication with the wireless network via both the first transmitter and additional transmitters (e.g. a second transmitter). Illustrative wireless telecommunications technologies include CDMA, GPRS, TDMA, GSM, and the like. The radio 120 may carry wireless communication functions or operations using any number of desirable wireless communication protocols, including 802.11 (Wi-Fi), WiMAX, LTE, 3G, 4G, LTE, 5G, NR, VoLTE, or other VoIP communications. As can be appreciated, in various embodiments, radio 120 can be configured to support multiple technologies and/or multiple radios can be utilized to support multiple technologies. A wireless telecommunications network might include an array of devices, which are not shown as to obscure more relevant aspects of the invention. Components such as a base station or communications tower (as well as other components) can provide wireless connectivity in some embodiments.

Figure 2:
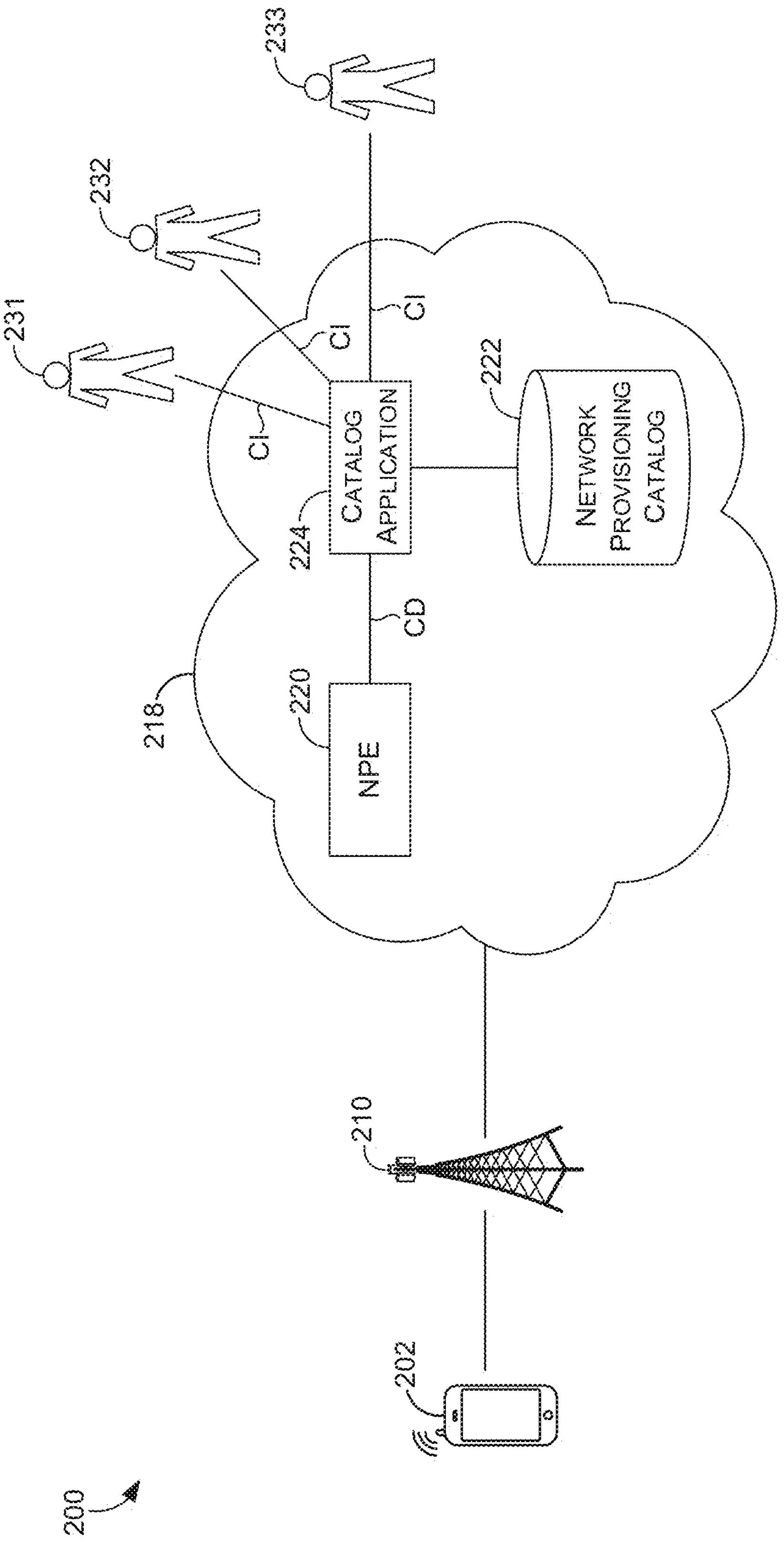
FIG. 2 illustrates a diagram of an exemplary network environment in which implementations of the present disclosure may be employed.

Referring now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 represents a high level and simplified view of relevant portions of a modern wireless telecommunication network. At a high level, the network environment 200 may generally be said to comprise one or more UEs, such as UE 202, one or more radio access network nodes, such as a radio access network node 210, and a core network 218, though in some implementations, it may not be necessary for certain features to be present. The network environment may include a number of routers, switches, and the like. The network environment 200 is generally configured for wirelessly connecting the UE 202 to data or services that may be accessible on one or more application servers or other functions, nodes, or servers not pictured in FIG. 2 so as to not obscure the focus on the present disclosure.

The UE 202 is illustrated generally, and may take any number of forms, including a tablet, phone, or wearable device, or any other device discussed with respect to FIG. 1 and may have any one or more components or features of the computing device 100 of FIG. 1. In some aspects, the UE 202 may not be a conventional telecommunications devices (i.e., a device that is capable of placing and receiving voice calls), but may instead take the form of devices that only utilizes wireless network resources in order to transmit or receive data; such devices may include IoT devices (e.g., smart appliances, thermostats, locks, smart speakers, lighting devices, smart receptacles, and the like).

The network environment 200 comprises the radio access network node 210 to which the UE 202 may potentially connect to (also referred to as 'camping on,' 'attaching,' in the industry). Though network environment 200 is illustrated with one radio access network node 210, one skilled in the art will appreciate that more radio access network nodes may be present in any particular network environment. The radio access network node 210 is configured to wirelessly communicate with the UE 202. In aspects, the radio access network node 210 may communicate with the UE 202 using any wireless telecommunication protocol desired by a network operator, including but not limited to 3G, 4G, 5G, 6G, 802.11x and the like.

The core network 218 of the network environment 200 comprises a Network Provisioning Engine (NPE) 220, a Network Provisioning Catalog 222, and a Catalog Application 224. The core network 218 provides services to the UE 202 and may comprise such in order to do so. For example, the NPE 220 may act as the central system that orchestrates the provisioning of network services. When the UE 202 requests a service, such as voice calling, data access, or messaging, the NPE 220 receives these service requests and may translate them into specific network configurations required to fulfill the request. In order to do this, the NPE 220 consults the Network Provisioning Catalog 222, which contains detailed mappings between CFSs (e.g., the service request by the UE 202) and the corresponding NFSs and NEs needed to deliver those services.

When using a particular catalog version from the Network Provisioning Catalog 222 (e.g., to translate CFS requests into specific network configurations), the NPE 220 actively communicates with various NEs such as routers, switches, Home Location Registers (HLR), and Policy Enforcement Servers (NAP) to configure and allocate the necessary resources. In doing so, the UE 202 may be provided the requested service, whether it's initiating a call, setting up a data session, or enabling roaming capabilities. The NPE 220 may help ensure that these configurations are applied in real-time, helping to enable seamless and uninterrupted service to the UE 202.

The Network Provisioning Catalog 222 may act as a repository within the core network 218 that contains detailed mapping and configurations necessary for delivering CFSs to the UE 202. The Network Provisioning Catalog 222 may include definitions of various services offered by the network, such as voice, data, and messaging. For example, the Network Provisioning Catalog 222 might detail the required bandwidth allocations, QoS parameters, IP address assignments, and security settings necessary for provisioning a particular CFS to the UE 202. By providing this structured and detailed information, the Network Provisioning Catalog 222 helps enable the NPE 220 to efficiently configure the network and help ensure that CFSs are delivered as intended to end customers.

The Catalog Application 224 may help facilitate the CI/CD of the Network Provisioning Catalog 222. The Catalog Application 224 may serve as the platform where engineers, such as engineers 231, 232, and 233, can simultaneously work on updating and refining the Network Provisioning Catalog 222. Additionally, the Catalog Application 224 may play a role in determining which version of the Network Provisioning Catalog 222 should be used for provisioning the requested CFS to the UE 202. For example, in situations where the UE 202 is experiencing difficulties in getting the requested CFS provisioned by the NPE 220, an additional verification of accuracy is desired, and/or any time a catalog version of the Network Provisioning Catalog 222 is being selected to provision a CFS, the Catalog Application 224 may ensure that the selected catalog version is free of critical discrepancies so that service is not interrupted when provisioning the CFS to the UE 202.

As will be discussed further in regards to FIG. 3, to achieve this, the Catalog Application 224 may generate an ontological knowledge graph for both a pre-configured (e.g., a previous) version and a new or modified version of the Network Provisioning Catalog 222. These knowledge graphs may represent the relationships, attributes, and configurations for each version in a structured and semantically enriched format. The Catalog Application 224 may then perform a comparison between the two knowledge graphs to identify any discrepancies that might exist. In some aspects, the Catalog Application 224 may identify a critical discrepancy in the new version of the catalog (e.g., the second catalog version), which would lead to service degradation to the UE 202 is the CFS was provisioned used the new version of the catalog. Based on identifying the critical discrepancy, the Catalog Application 224 may select the pre-configured version (e.g., the first catalog version) of the Network Provisioning Catalog 222 for provisioning the CFS to the UE 202. This helps ensure that the CFS is delivered reliably and without interruption.

Figure 3:
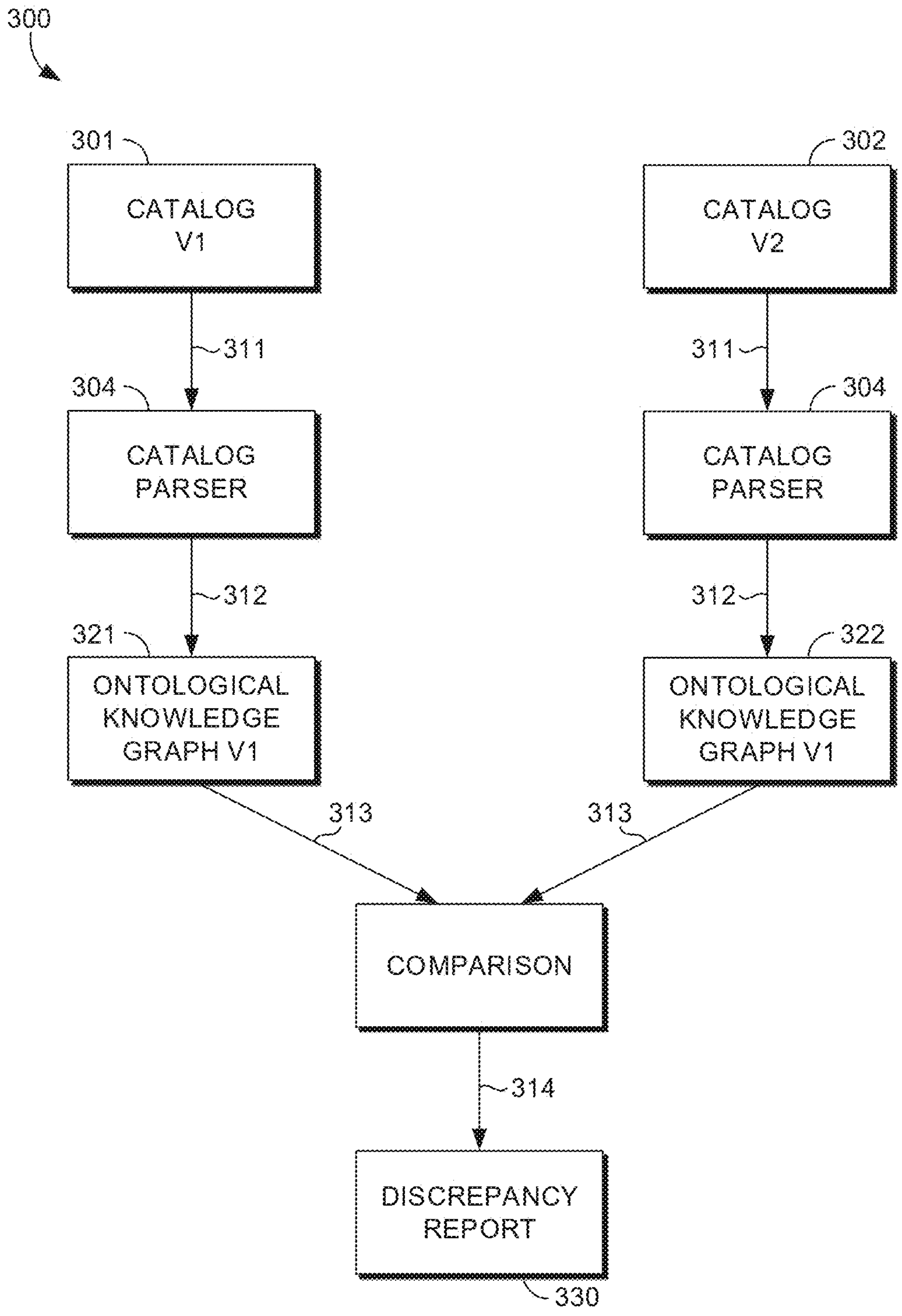
FIG. 3 illustrates an example flow diagram in which implementations of the present disclosure may be employed.

Turning now to FIG. 3, a flow diagram is illustrated in accordance with one or more aspects of the present disclosure. A flow diagram 300 discussed herein is not meant to exhaustively show every interaction that would be necessary to practice the invention, so as not to obscure the present disclosure, but is instead meant to illustrate one or more potential interactions for the generation and comparison of ontological knowledge graphs based on network provisioning catalogs. The flow diagram 300 may be relevantly said to illustrate an example method for how a catalog application, such as Catalog Application 224, might compare two different catalog versions, as discussed above in regards to FIG. 2, and generate a discrepancy report.

Initially, a catalog application (e.g., Catalog Application 224) may identify two versions of a network provisioning catalog to be compared, such as a first catalog version 301 and a second catalog version 302. In some aspects, the first catalog version 301 and the second catalog version 302 are two different representations of a same segment associated with a CFS (e.g., a voice call service, a text message service, and/or internet access). In some aspects, the first catalog version 301 comprises a pre-configured mapping of the CFS with one or more NFSs. In some aspects, the second catalog version 302 comprises a new or modified mapping of the CFS with one or more NFSs. In some aspects, to organize and manage these versions efficiently, the catalog application may separate the first catalog version 301 and the second catalog version 302 into distinct folders, helping to ensure that each version is stored independently and without overlap, which may be useful if they are selected again for future comparisons since they won't have to redundantly perform the same steps on the same catalog version to access its knowledge graph.

At step 311, the catalog application may prepare to ingest and parse the configurations and schemas associated with the first catalog version 301 and the second catalog version 302 at a catalog parser 304. In some aspects, the catalog parser 304 may be an integral component of the catalog application, designed to interpret and process a network provisioning catalog's data while, in other aspects, the catalog parser 304 may exist as a separate component in communication with the catalog application. Operating in conjunction with the catalog application, the catalog parser 304 may help ensure that the catalog is accurately understood and managed, supporting the CI/CD workflows and providing a reliable foundation for subsequent catalog operations. For example, utilizing the catalog parser 304, the catalog application may read the defined schemas, which may outline the relationships, attributes, and dependencies within each version. This schema preparation may be helpful for providing the structured format used to accurately parse the catalog data. The catalog parser 304 may then ingest the first catalog version 301 and the second catalog version 302, parsing the JSON files and other configuration data to extract the relevant information regarding the CFS and related NFSs and NEs. Such a parsing process may help lay the groundwork for generating ontological knowledge graphs in the next step.

At step 312, after the catalog parser 304 has ingested and parsed the first catalog version 301 and the second catalog version 302, the catalog application may proceed to generate ontological knowledge graphs, such as an ontological knowledge graph 321 and an ontological knowledge graph 322, for each version. This process may involve transforming the parsed data into structured, semantically rich graphs that represent the relationships, attributes, and dependencies defined in the catalog schemas. The catalog application may interpret the schema of each catalog version, identifying key entities such as CFSs, NFSs, and NEs, and the relationships between them. Using an ontology framework, such as the OWLReady2 Python library, the catalog application maps these entities and relationships to an ontological model, creating classes for each entity type and establishing object properties to represent their interconnections. The parsed data may then be populated into these classes and properties, constructing a knowledge graph for each of the first catalog version 301 and the second catalog version 302 that visually and logically represents the network's configuration.

At step 313, the catalog application may compare the ontological knowledge graph 321 with the ontological knowledge graph 322 to identify any discrepancies between them. This comparison may involve analyzing the relationships, attributes, and configurations within each graph to detect differences that could impact the provisioning and performance of a requested CFS to a UE (e.g., UE 202). The catalog application may evaluate each entity, along with their associated properties, looking for inconsistencies, changes in attribute values, or alterations in network configurations. A critical discrepancy might be identified, if, for example, the second catalog version 302 contains a misconfigured bandwidth allocation for a data service, leading to potential service degradation or failure. Another example would be if a key NE, such as a firewall configuration, is incorrectly altered or removed, exposing the network to security vulnerabilities. On the other hand, non-critical discrepancies might include minor changes in attribute naming conventions or modifications to metadata that do not affect service functionality.

At step 314, after the catalog application has compared the knowledge graphs from the first catalog version 301 and the second catalog version 302, it may proceed to generate a discrepancy report. This report may be designed to capture the identified discrepancies, and may categorize them as either critical or non-critical, based on their potential impact on network provisioning and service delivery. The catalog application may automatically compile the results of the comparison into a structured report, formatted in JSON. This JSON format may provide flexibility and ease of integration with other systems, which may allow the report to be easily parsed and interpreted by various applications and tools. The JSON report may include key details such as the specific entities involved, the nature of the discrepancies (e.g., misconfigured attributes, altered relationships), and their classification as critical or non-critical. Once generated, the discrepancy report may be provided to a graphical user interface (GUI) of the catalog application. The GUI may be designed to visually present this information, making is accessible and understandable to engineers and network administrators. Additionally, the discrepancy report may be made accessible to two or more Cross-Functional Requirements (XFRs), helping ensure that different teams or systems involved in the network provisioning process can review and act on the findings. This shared access facilitates coordinated efforts across various departments, such as network operations, security, and quality assurance, ensuring that all relevant stakeholders are informed and can contribute to resolving the discrepancies.

Figure 4:
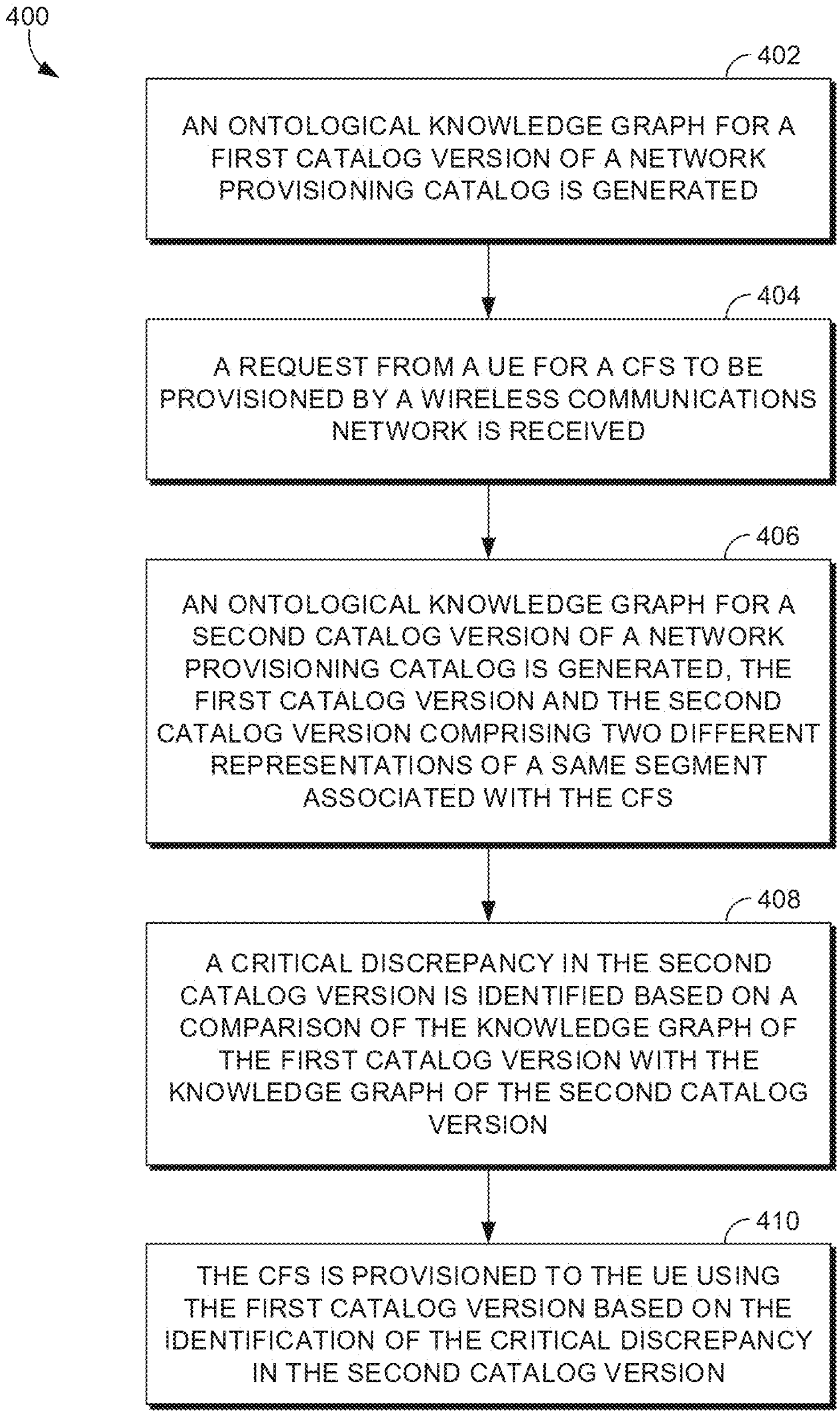
FIG. 4 illustrates a flow chart of an exemplary method for providing uninterrupted service in a communications network in which implementations of the present disclosure may be employed.

Turning now to FIG. 4, a flow chart is provided that illustrates one or more aspects of the present disclosure relating to a method 400 for providing uninterrupted wireless communication service to a UE in a wireless communications network. At a first step 402, an ontological knowledge graph for a first catalog version of a network provisioning catalog is generated. At a second step 404, a request from a UE for a CFS to be provisioned by a wireless communications network is received. At a third step 406, an ontological knowledge graph for a second catalog version of a network provisioning catalog is generated, the first catalog version and the second catalog version comprising two different representations of a same segment associated with the CFS. At a fourth step 408, a critical discrepancy in the second catalog version is identified based on a comparison of the knowledge graph of the first catalog version with the knowledge graph of the second catalog version. At a fifth step 410, the CFS is provisioned to the UE using the first catalog version based on the identification of the critical discrepancy in the second catalog version.

Figure 5:
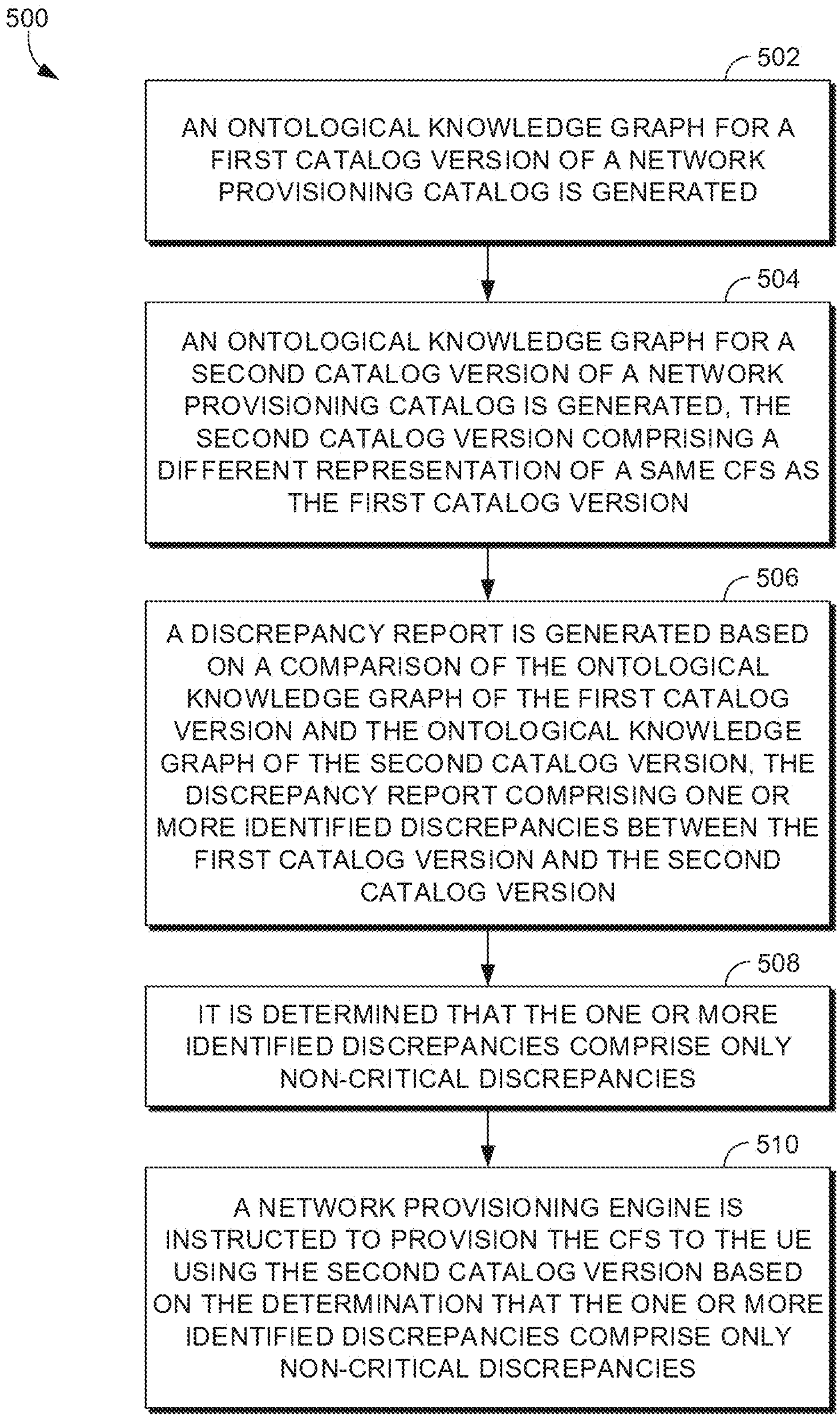
FIG. 5 illustrates a flow chart of an exemplary method for providing uninterrupted service in a communications network in which implementations of the present disclosure may be employed.

Turning now to FIG. 5, a flow chart is provided that illustrates one or more aspects of the present disclosure relating to a method 500 for providing uninterrupted wireless communication service to a UE in a wireless communications network. For example, at a first step 502, an ontological knowledge graph for a first catalog version of a network provisioning catalog is generated. At a second step 504, an ontological knowledge graph for a second catalog version of a network provisioning catalog is generated, the second catalog version comprising a different representation of a same CFS as the first catalog version. At a third step 506, a discrepancy report is generated based on a comparison of the ontological knowledge graph of the first catalog version and the ontological knowledge graph of the second catalog version, the discrepancy report comprising one or more identified discrepancies between the first catalog version and the second catalog version. At a fourth step 508, it is determined that the one or more identified discrepancies comprise only non-critical discrepancies. At a fifth step 510, a network provisioning engine is instructed to provision the CFS to the UE using the second catalog version based on the determination that the one or more identified discrepancies comprise only non-critical discrepancies.

Figure 6:
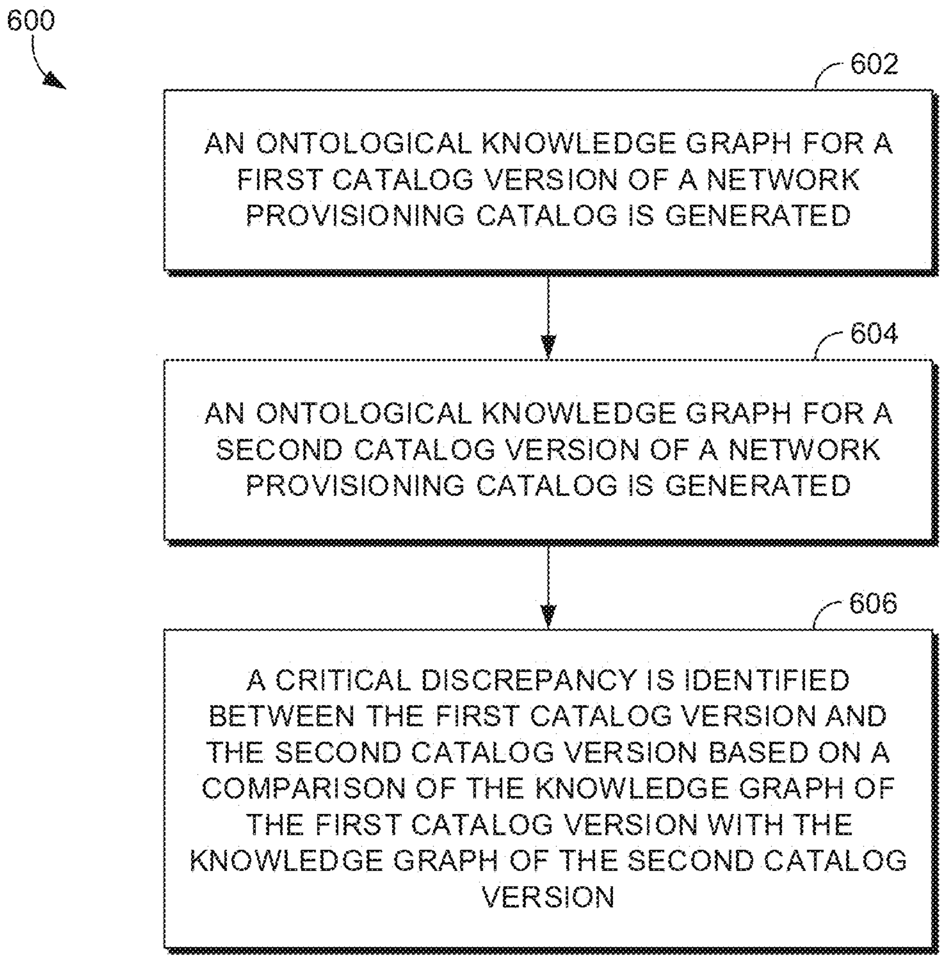
FIG. 6 illustrates a flow chart of an exemplary method for service provisioning discrepancy analysis in a communications network in which implementations of the present disclosure may be employed.

Turning now to FIG. 6, a flow chart is provided that illustrates one or more aspects of the present disclosure relating to a method 600 for service provisioning discrepancy analysis in a communications network. For example, at a first step 602, an ontological knowledge graph for a first catalog version of a network provisioning catalog is generated. At a second step 604, an ontological knowledge graph for a second catalog version of a network provisioning catalog is generated. At a third step 606, a critical discrepancy is identified between the first catalog version and the second catalog version based on a comparison of the knowledge graph of the first catalog version with the knowledge graph of the second catalog version. Additional steps may include initiating the call to a destination user equipment using the unique identifier received from the communication network.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for providing uninterrupted wireless communication service to a user equipment (UE) in a wireless communications network, the system comprising:

- a radio access network node;
- a network storage device of the wireless communication network;
- a network device comprising one or more processors; and
- a non-transitory computer-readable media comprising executable instructions that, when executed, cause the network device to perform operations in the wireless communications network, the executable instructions comprising the steps of:
- generating an ontological knowledge graph for a first catalog version of a network provisioning catalog;
- receiving a request from the UE for a Customer Facing Service (CFS) to be provisioned by the wireless communications network;
- generating an ontological knowledge graph for a second catalog version, wherein the first catalog version and the second catalog version comprise two different representations of a same segment associated with the CFS;
- based on a comparison of the knowledge graph of the first catalog version with the knowledge graph of the second catalog version, classifying a detected difference between the knowledge graphs as a critical discrepancy when the detected difference would interrupt provisioning of the requested CFS; and
- in response to the critical discrepancy, preventing use of the second catalog version, by a network provisioning engine (NPE) and causing the NPE to provision the requested CFS to the UE using the first catalog version.

2. The system of claim 1, wherein the first catalog version comprises a pre-configured mapping of the CFS with one or more Network Facing Services (NFSs) of the wireless communications network.

3. The system of claim 1, wherein the second catalog version comprises a new or modified mapping of the CFS with one or more Network Facing Services (NFSs) of the wireless communications network.

4. The system of claim 1, wherein the first catalog version and the second catalog version are network provisioning catalogs comprising a mapping of the CFS with one or more Network Facing Services (NFSs) of the wireless communications network.

5. The system of claim 4, wherein the NFSs comprise one or more Network Elements (NEs).

6. The system of claim 1, wherein the CFS comprises one or more of a voice call service, a text message service, and internet access.

7. The system of claim 1, wherein identifying the critical discrepancy comprises generating a discrepancy report comprising one or more comparisons of the first catalog version and the second catalog version, the one or more comparisons comprising the critical discrepancy.

8. The system of claim 1, wherein the critical discrepancy results in an interruption of services provisioned to the UE.

9. The system of claim 1, wherein the discrepancy report is provided in a JavaScript Object Notation (JSON) format to a graphical user interface (GUI) of a catalog application, and wherein the critical discrepancy is identified at the catalog GUI.

10. The system of claim 9, wherein the discrepancy report is accessible by two or more Cross-Functional Requirements (XFRs).

11. Non-transitory computer-readable media comprising executable instructions that, when executed, causes a user equipment (UE) comprising one or more processors to perform operations for providing uninterrupted wireless communication service to a UE in a wireless communications network, the executable instructions comprising:

generating an ontological knowledge graph for a first catalog version of a network provisioning catalog;

generating an ontological knowledge graph for a second catalog version, the second catalog version comprising a different representation of a same Customer Facing Service (CFS) as the first catalog version;

generating a discrepancy report based on a comparison of the ontological knowledge graph of the first catalog version and the ontological knowledge graph of the second catalog version, the discrepancy report comprising one or more identified discrepancies in mappings, attributes, or relationships used to provision the CFS between the first catalog version and the second catalog version;

determining that the one or more identified discrepancies comprise only non-critical discrepancies; and based on the determination, instructing a network provisioning engine to provision the CFS to the UE using the second catalog version.

12. The computer-readable media of claim 11, wherein the first catalog version and the second catalog version are network provisioning catalogs comprising a mapping of the CFS with one or more Network Facing Services (NFSs).

13. The computer-readable media of claim 11, wherein the first catalog version comprises a pre-configured mapping of the CFS with one or more Network Facing Services (NFSs) of the wireless communications network.

14. The computer-readable media of claim 11, wherein the second catalog version comprises a new or modified mapping of the CFS with one or more Network Facing Services (NFSs) of the wireless communications network.

15. A method for service provisioning discrepancy analysis in a communications network, the method comprising:

generating an ontological knowledge graph for a first catalog version of a network provisioning catalog;

generating an ontological knowledge graph for a second catalog version of the network provisioning catalog;

based on a comparison of the knowledge graph of the first catalog version with the knowledge graph of the second catalog version, identifying a critical discrepancy between the first catalog version and the second catalog version; and generating a discrepancy report based on the comparison, the discrepancy report comprising the identified critical discrepancy between the first catalog version and the second catalog version, wherein the identified critical discrepancy would interrupt provisioning of a Customer Facing Service requested by a user equipment (UE); and in response to the identified critical discrepancy, preventing use of the second catalog version by a network provisioning engine (NPE) and causing the NPE to provision the requested CFS to the UE using the first catalog version.

16. The method of claim 15, wherein the second catalog version comprises a different representation of a same Customer Facing Service as the first catalog version.

17. The method of claim 16, wherein the first catalog version comprises a pre-configured mapping of the CFS with one or more Network Facing Services (NFSs) of the communications network.

18. The method of claim 15, wherein the second catalog version comprises a new or modified mapping of the CFS with one or more Network Facing Services (NFSs) of the communications network.

19. The method of claim 15, wherein the first catalog version and the second catalog version are network provisioning catalogs comprising a mapping of a Customer Facing Service with one or more Network Facing Services.

* * * * *